United States Patent [19]

Levatter

[11] Patent Number: 5,044,717
[45] Date of Patent: Sep. 3, 1991

[54] METHOD AND APPARATUS FOR COUPLING HIGH ENERGY LASER TO FIBEROPTIC WAVEGUIDE

[75] Inventor: Jeffrey I. Levatter, Rancho Santa Fe, Calif.

[73] Assignee: AccuLase, Inc., San Diego, Calif.

[21] Appl. No.: 467,128

[22] Filed: Jan. 18, 1990

[51] Int. Cl.⁵ .............................................. G02B 6/32
[52] U.S. Cl. ........................................ 385/33; 385/15
[58] Field of Search ............................ 350/96.15, 96.18

[56] References Cited

U.S. PATENT DOCUMENTS

| | | | |
|---|---|---|---|
| 4,681,396 | 7/1987 | Jones | 350/96.18 |
| 4,732,448 | 3/1988 | Goldenberg | 350/96.18 |
| 4,784,135 | 11/1988 | Blum et al. | 128/303.1 |
| 4,799,754 | 1/1989 | Goldenberg | 350/96.18 |
| 4,842,360 | 6/1989 | Caro et al. | 350/96.18 |
| 4,844,574 | 7/1989 | Chande | 350/96.18 |
| 4,929,045 | 5/1990 | Fuller | 350/96.18 X |

Primary Examiner—John D. Lee
Assistant Examiner—Phan T. Heartney
Attorney, Agent, or Firm—Pretty, Schroeder, Brueggemann & Clark

[57] ABSTRACT

A high energy laser-to-fiberoptic waveguide coupling method and apparatus is disclosed for optically coupling substantially all of the beam of a high energy laser into a small diameter optical fiber. High energy lasers often generate beams having cross-sectionally non-uniform energy densities. The coupling apparatus includes an optical fiber segment located between the laser and the small diameter optical fiber, for receiving substantially all of the non-uniform beam and for transforming it into a circular cross-section beam of uniform energy density. Substantially all of the uniform beam is directed into the small diameter optical fiber.

13 Claims, 1 Drawing Sheet

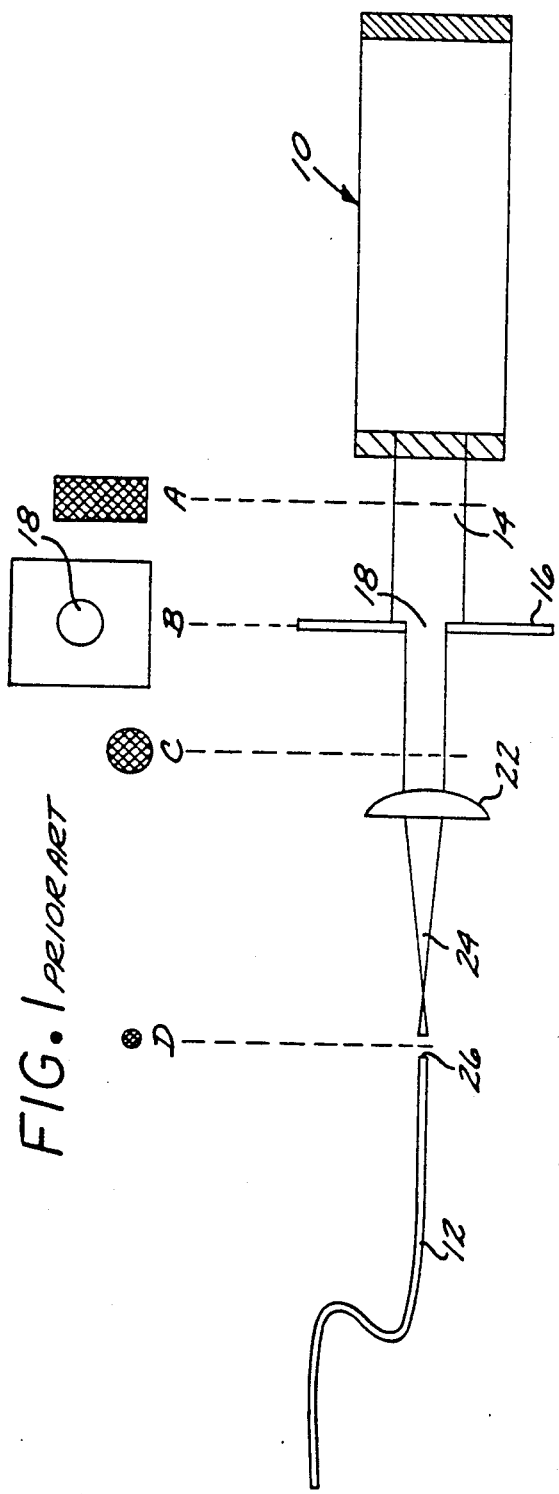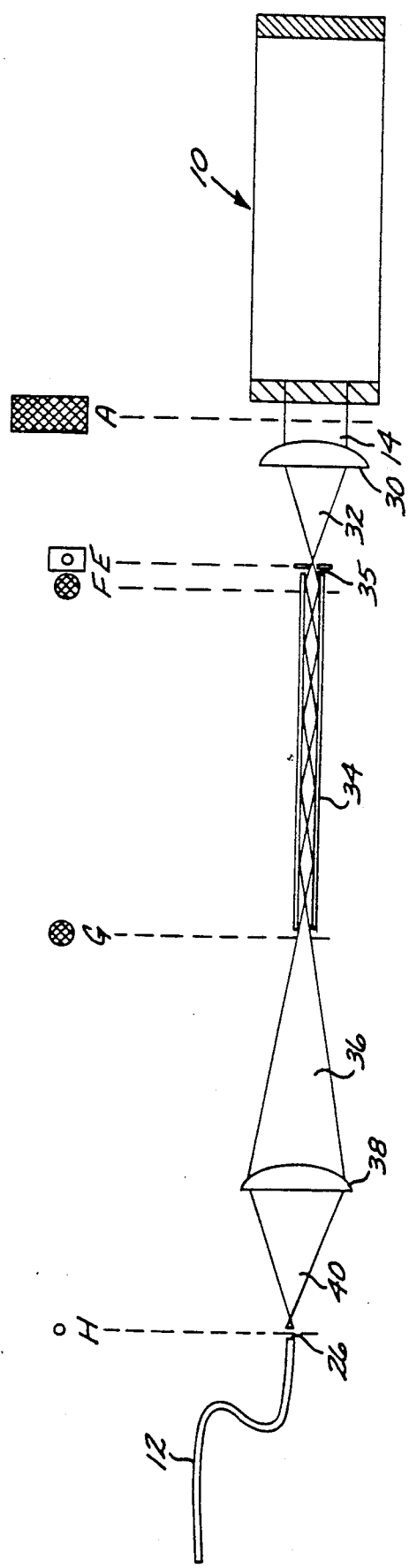

METHOD AND APPARATUS FOR COUPLING HIGH ENERGY LASER TO FIBEROPTIC WAVEGUIDE

BACKGROUND OF THE INVENTION

1. Field of the Invention

This invention relates generally to light transmitting optical fiber waveguides, and more particularly to a coupling apparatus for optically coupling a large cross-section high energy laser beam into a small diameter optical fiber waveguide.

2. Description of the Related Art

Blood vessel patency is very important to good cardiovascular health and can be severely reduced by deposits of cholesterol, fibrous material, and calcium on the inner surface of blood vessels such as arteries. These deposits are referred to as atherosclerotic plaque. If the plaque accumulates at one location, it can form an obstruction and drastically narrow the lumen of the artery, restricting and even totally blocking the flow of blood through the artery. Heart attack, stroke, and death can follow.

Current techniques and clinical applications make use of high energy laser beams to irradiate plaque until it is "vaporized," or changed into a form that is either removed from the body or harmlessly carried away in the bloodstream. This procedure is known as laser angioplasty, and involves inserting an optical fiber into a blood vessel, placing the distal end of the optical fiber adjacent the plaque obstruction, and conducting laser energy through the fiber to direct it at the plaque. Conventional angiography or angioplasty catheter insertion techniques are used to insert the optical fiber into the blood vessel. This form of relatively non-invasive laser microsurgery can eliminate the need for more radical surgical procedures, such as coronary artery bypass surgery. Once the laser catheter is in position, the obstruction can be vaporized by the laser energy. Because the inside diameter of a blood vessel can be very small (1 or 2 mm) in diameter and very tortuous in pathway, the optical fibers carrying the laser energy must be very small in diameter and extremely flexible. Typical fibers used in this application are made of fused silica or quartz and range in diameter from 50 to 1000 um.

Both continuous-wave (CW) lasers and pulsed, high energy lasers have been used to provide the vaporizing laser energy. The goal of the laser is to remove the plaque with laser energy without creating any thermal or mechanical injury to the healthy part of the blood vessel. CW, visible, and infra-red laser beams can often remove plaque, but they also have a side effect of creating severe injury (that is, burning) to the tissue directly adjacent the lased area, whether healthy or not. There is, however, a type of laser that does not have the aforementioned problematic side effects, namely the excimer laser.

The excimer laser is a pulsed, high energy ultraviolet laser that can remove tissue by a non-thermal process known as photodecomposition, such as that described in U.S. Pat. No. 4,754,135. This non-thermal process can efficiently remove plaque without any thermal or mechanical injury to the adjacent healthy tissue. The most common excimer lasers are those that use rare-gas/halides (RGH) such as argon-fluoride, krypton-chloride, krypton-fluoride, xenon-chloride, or xenon-fluoride as the laser medium. With these RGH laser media, the laser energy pulses typically last on the order of tens to hundreds of nanoseconds in time, with an energy level ranging from a few millijoules to several joules per pulse.

In order to be useful, the laser beam must be efficiently coupled into the small diameter optical fiber that transmits the laser energy to the target atherosclerotic plaque. The coupling of the beam to the optical fiber is typically accomplished by a set of convex and/or concave focusing lenses. Because it is desirable to couple the largest fraction of total laser energy into the small fiberoptic, the input surface of the optical fiber is typically subjected to a beam of very high energy density. In this coupling process, great care must be taken not to exceed the laser-energy-density damage threshold of the fiber material. For fused silica fibers in the ultraviolet part of the spectrum this value is typically in the range of 50 to 100 mj/mm$^2$. If the damage threshold is exceeded, catastrophic failure of the fiber can occur.

Because of the manner in which it is usually generated, the beam from an excimer laser is typically square or rectangular in cross-section, and its energy density is usually spatially very non-uniform. That is, in cross-section, the beam contains local areas of greater and lesser energy density, generating so-called "hot spots" in the beam. When the laser beam is focused onto the very small surface area of an output fiberoptic, even though the average spatial energy density of the beam might be below the fiber's damage threshold, the peak spatial non-uniformities, or hot spots, can easily exceed the damage threshold. The energy density of the hot spots can be great enough to cause catastrophic damage to the optical fiber both at the fiber input surface where the beam enters the fiber and within the bulk of the fiber. Thus, the average energy density of the beam that may be safely used is often limited by the energy density of the hot spots. The focusing lenses used for directing the beam from the laser into the fiber do nothing to alleviate these non-uniformities. Therefore, in order to maximize the laser energy input to the fiber, and hence the output from the fiber, the energy density distribution of the laser beam entering the fiber must be completely free of all spatial hot spots.

A typical prior art laser-optical fiber coupling apparatus for laser angioplasty is described in U.S. Pat. No. 4,842,360 and is illustrated in FIG. 1. In the drawing, a high energy excimer laser 10 is coupled to a small diameter output optical fiber 12. The distal end of the fiber is inserted into a patient's blood vessel and advanced to the site of an arterial obstruction. The laser generates a beam 14 having a rectangular cross-section, as indicated at the point marked A. The beam is directed through an aperture plate 16 having a circular aperture 18 in its center. A cross-section of the aperture plate is shown at B. The aperture plate produces a beam 20 having a circular cross-section, as illustrated at the point labeled C. The beam is typically directed to a focusing lens 22. This lens focuses and concentrates the beam into a smaller diameter beam 24 having a reduced circular cross-section. The beam then enters the end of the small diameter optical fiber 12 at a fiber input surface 26, where it will be conducted to the desired point. The input surface is typically located from the lens at a distance slightly greater than the focal length of the lens, in order to prevent the beam from converging inside the fiber and damaging the fiber from excessive laser energy density. The beam cross-section is shown at the point marked D. Alternatively, an additional lens may be inserted between lens 22 and the input surface of the fiber 26 in order to collimate the laser beam as it enters the fiber 12. If the laser beam has hot spots anywhere within the beam cross-section that exceed the damage threshold, the input surface of the optical fiber can become scarred, pitted, or fused. The optical fiber would then be incapable of effectively transmitting the laser energy.

There are several drawbacks to the FIG. 1 type of apparatus. First, the aperture plate 16 geometrically obscures anywhere from 12% to 60% of the beam 14 energy by eliminating the squared corners of the excimer laser beam 14. Of course, this is a tremendous waste of the energy generated by the laser and requires the use of a laser much larger than would otherwise be needed if all the laser's energy could be coupled into the output optical fiber. Second, the apparatus does nothing to eliminate the spatial nonuniformities, or hot spots, generated in the beam and transmitted to the small diameter output optical fiber 12. In addition, such an apparatus requires careful optical alignment of all of the elements from the laser 10 to the input surface 26 at the small diameter optical fiber. Any misalignment can cause an energy loss at best and catastrophic damage to the optical fiber at worst. The optical fiber is typically a disposable item, and establishing optical alignment with the laser can be an exacting, time consuming process that must be performed every time a ne fiberoptic is connected to the laser.

Therefore, there is a need for a high energy laser-to-fiberoptic waveguide coupling technique and apparatus for coupling a high energy, non-uniform energy density laser beam to a small diameter optical fiber without allowing the beam to cause damage to the optical fiber. Thus, the apparatus should eliminate the damaging hot spots present in the beam. Such an apparatus also should maximize the laser beam transfer efficiency by utilizing substantially all of the beam generated by the high energy laser without discarding portions of the beam to obtain the desired circular cross-sectional shape.

SUMMARY OF THE INVENTION

The present invention provides a novel method and apparatus for coupling a high energy, spatially non-uniform energy density laser beam of any geometrical cross-sectional shape to a small diameter optical fiber, with minimum risk of damage to the fiber and maximum coupling efficiency. In accordance with the present invention, optical transmission means are provided between the laser and the small diameter optical fiber, for eliminating any hot spots in the beam by generating a laser beam of uniform spatial energy density (a "homogenized" beam) at the small diameter optical fiber input surface. The optical transmission means itself is not susceptible to being damaged by beam hot spots that would exceed the damage threshold of the small diameter optical fiber because of the much larger optical surface area, and hence much lower beam energy density, typically employed. In addition, the optical transmission means transmits substantially all of the laser energy generated by the laser without sacrificing part of the beam in order to generate a beam having the desired cross-sectional shape.

In a preferred embodiment, the optical transmission means takes the form of a large core optical fiber coupling segment comprising an optical fiber having a diameter substantially greater than that of the small diameter output optical fiber. The larger diameter provides a much larger surface area and effectively lowers the beam energy density so that even hot spots are below any damage threshold. The length of the optical fiber coupling segment is preferably selected to be sufficiently long enough that multiple internal reflections of the beam occur along the optical fiber segment to produce a completely scrambled and therefore homogenized beam having a circular cross-section and free of any intensity hot spots. A focusing lens is preferably located between the laser and the optical fiber coupling segment to reduce the cross-sectional size of the beam and direct all of the high energy, non-uniform beam into the coupling fiber.

In the novel apparatus, a focusing lens is located between the optical transmission means (the optical fiber coupling segment) and the small diameter output optical fiber, and directs substantially all of the spatially uniform energy density beam into the small diameter optical fiber. There is no need to make use of an aperture plate that sacrifices part of the beam to produce a laser beam having the desired cross-sectional size and shape, and therefore there is no waste of the beam. Thus, the present invention can convert any arbitrary cross-section laser beam into a circular pattern with near perfect efficiency, thereby significantly increasing the overall efficiency of the laser delivery system. Because the optical fiber coupling segment has eliminated all beam hot spots, making the peak beam energy density equal to its average value, the maximum average energy density level that can be delivered at the small diameter optical fiber interface can be significantly increased to a value just below the damage threshold of the fiber.

Further features and advantages of the present invention will become apparent from the following detailed description of a preferred embodiment of the invention illustrated in the accompanying drawings. Like reference numerals refer to like elements in the drawings.

BRIEF DESCRIPTION OF THE DRAWINGS

FIG. 1 is a representation of a prior art laser apparatus used for laser angioplasty.

FIG. 2 is a representation of a laser apparatus incorporating the principles of the present invention.

DESCRIPTION OF THE PREFERRED EMBODIMENT

The following description is of the best presently contemplated mode of carrying out the invention. This description is made for the purpose of illustrating the general principles of the invention and is not to be taken in a limiting sense. The scope of the invention is best determined by reference to the appended claims.

FIG. 2 shows a representation of a laser delivery system in accordance with the present invention. The system couples the beam from a high energy excimer laser 10 to a small diameter output optical fiber 12 of circular cross-section, which is inserted into a patient's blood vessel (not shown) and advanced to the site of a vascular obstruction. The excimer laser generates a pulsed rectangular cross-sectional shape beam 14 that has a spatially non-uniform energy density. That is, the energy density of a cross-section of the beam is substantially non-uniform and has areas of greater intensity, or hot spots. The energy density of the beam hot spots can be great enough to cause damage to the optical fiber 12 when focused onto its surface. The physical cross-section of the beam 14 is illustrated at the point marked A.

From the laser, the beam passes through a focusing lens 30 to produce a smaller beam 32 having the same rectangular cross-sectional shape but reduced in size, as illustrated at the point marked E, still with the spatial energy density non-uniformities, and still larger than the diameter of the output optical fiber 12.

A large diameter optical fiber coupling segment 34 is positioned to receive the reduced-size, non-uniform energy density beam 32 at a laser input surface 35. The diameter of the optical fiber coupling segment is large enough to accommodate the entire cross-sectional area of the reduced rectangular beam 32. That is, in cross-section, the rectangular beam can be inscribed within the diameter of the optical fiber coupling segment. The cross-section of the optical fiber coupling segment is illustrated at the point marked F. The input surface 35 of the optical fiber coupling segment is located a distance from the focusing lens 30 that exceeds the focal length of the lens so that only a diverging beam enters the large diameter fiber waveguide 34. This assures that the beam will not focus inside the coupling segment 34 and will undergo man internal reflections within the optical fiber, completely homogenizing any spatial non-uniformities contained in the beam 32.

Because the beam 32 does not have to be focused all the way down to the small diameter of the optical fiber 12, the peak energy density of the beam hot spots never reaches a level that would damage the optical fiber coupling segment 34. The length of the optical fiber coupling segment is selected such that enough internal reflections of the beam 32 will occur along its length that the beam 36 emerging from the optical fiber segment is converted into a circular cross-section while simultaneously homogenizing the beam energy density distribution to remove all spatial non-uniformities. That is, the peak energy density of the homogenized beam is equal to the average energy density of the beam. The cross-section of the homogenized beam 36 is illustrated at the point marked G. Thus, the large diameter coupling optical fiber segment "homogenizes" the beam 32, and comprises a homogenizing optical fiber segment 34 producing a homogenized beam 36 of uniform energy density containing virtually all of the laser energy fed into the input end of the large diameter coupling fiber.

As the homogenized beam 36 emerges from the optical fiber segment 34, it begins to diverge and is directed through a convex-type focusing lens 38, generating a converging, circular, spatially uniform energy density beam 40. An input surface 26 of the small diameter output optical fiber 12 is located at a distance from the focusing lens such that virtually all of the beam is directed into the fiber. The uniform beam 40 is illustrated in cross-section at the point marked H. The uniform beam input surface of the small diameter optical fiber is located a distance from the homogenized beam focusing lens 38 that slightly exceeds the focal length of the lens to assure that only a diverging laser beam enters the small diameter output fiberoptic. The uniform beam meets the small diameter optical fiber 12 at the input surface 26, and is then transmitted down the length of the fiber to the site of atherosclerotic plaque.

When the laser 10 generates its high energy optical pulses, the pulses are first reduced in cross-section by the lens 30, then the beam 32 is homogenized by the large diameter coupling optical fiber segment 34, and the resulting beam 36 is then directed through a focusing lens 38 to the small diameter output optical fiber 12. In this way, substantially all of the generated beam is transmitted to the small diameter fiber. The only optical losses are those associated with Fresnel reflection from any uncoated optical surfaces and those due to small absorption losses in the quartz optics. The Fresnel reflections can be reduced to near zero by appropriate anti-reflection coatings, as is standard in the industry. There is no aperture plate, and minimal energy loss occurs as the beam moves from the laser to the small diameter fiber and as it is conducted down the fiber. Therefore, wastage of the beam energy is eliminated and a more efficient system is obtained. In addition, the spatial non-uniformities are largely removed from the beam before the beam reaches the input surface of the small diameter fiber. Peak energy density non-uniformities from the laser are not propagated to the small diameter fiber. Therefore, the average energy density of the beam may be increased above that of conventional systems, without damage to the fiber.

In the illustrated apparatus, the small diameter output optical fiber 12 need not be carefully aligned by the user with every element back up through the laser 10 because the large diameter coupling fiber 34 is still a relatively flexible mechanical element capable of tolerating substantial lateral (X & Y) movements without effecting the quality of the transmitted laser beam. Rather, the critical alignment by the user will only be of the optical fiber 12 with the focusing lens 38. Typically, the optical fiber will be a disposable item. The alignment between the laser 10, the first focusing lens 30, the large diameter optical fiber segment 34, and the second focusing lens 38 is more difficult and can be carefully set at the point of manufacture, while the user can easily align the small diameter optical fiber 12 with the laser 10 by aligning the fiber with the focusing lens 38. Economical and efficient methods of aligning the optical fiber with the focusing lens are well-known to those skilled in the art. Thus, the critical components can be safely and accurately aligned at the point of manufacture, while the end user need not be concerned with such matters and does not have to carefully establish optical alignment with all of the optics every time a new fiberoptic is connected to the laser. This further increases the likelihood of substantially all of the beam being transmitted to the small diameter optical fiber.

While the present invention has been described with respect to a preferred embodiment, it is to be understood that variations may occur to those skilled in the art. Lasers other than excimer lasers, for example, may be used with the present invention. The present invention, therefore, should not be seen as being limited to the particular apparatus herein, but it should be understood that the present invention has wide applicability with respect to laser devices of different configurations. Such alternate configurations may be achieved by those skilled in the art in view of the description herein.

I claim:

1. A laser light beam coupling apparatus for optically coupling substantially all of a beam emitted by a high energy laser into a small diameter optical fiber, wherein the beam cross-section has a spatially non-uniform energy density distribution with maximum energy density levels that would damage the small diameter optical fiber if transmitted directly into the fiber, the apparatus comprising:

optical transmission means, located between the laser and the optical fiber, for operating on the beam emitted by the laser to produce a homogenized beam of spatially uniform energy density; and homogenized beam focusing means, located between the optical transmission means and the small diameter optical fiber, for directing substantially all of the homogenized beam into the small diameter optical fiber.

2. The apparatus as recited in claim 1, further comprising:
laser focusing means, located between the laser and the optical transmission means, for focusing all of the beam emitted by the laser into the optical transmission means and for changing the beam's cross-section, wherein the optical transmission means is located a distance from the laser focusing means.

3. The apparatus as recited in claim 1, wherein the optical transmission means comprises an optical fiber segment having a diameter substantially greater than that of the small diameter optical fiber and having a length sufficiently long that multiple internal reflections of the beam occur along its length to produce the homogenized beam of spatially uniform energy density.

4. Apparatus for producing a small diameter, high energy density light beam having a substantially uniform cross-sectional energy density from a high-energy laser that produces a beam having a substantially non-uniform cross-sectional energy density, the apparatus comprising:
first focusing means for optically reducing the cross-sectional size of the laser beam;
an optical fiber segment having an input end and an output end, the input end of the optical fiber segment receiving the reduced cross-section laser beam from the first focusing means for optically reducing and also transmitting the beam to its output end;
second focusing means, located adjacent to the output end of the optical fiber segment, for further optically reducing the cross-sectional size of the beam received from the optical fiber segment; and
a conducting optical fiber having a diameter less than the diameter of the optical fiber segment and having an input end positioned to receive the reduced cross-section beam from the second focusing means.

5. The apparatus as recited in claim 4, wherein the length of the optical fiber segment is selected to be long enough to produce sufficient internal reflections of the cross-sectionally non-uniform laser beam to eliminate substantially all cross-sectional non-uniformities in the beam.

6. A laser light beam coupling apparatus for optically coupling the beam of a high energy laser into a small diameter optical fiber, the beam having an energy density that is not uniformly distributed in cross-section, the apparatus comprising:
an optical fiber segment having an input end and ar output end, the input end being optically coupled with the high energy laser and the output end being optically coupled with the small diameter optical fiber, wherein the optical fiber segment diameter is substantially greater than that of the small diameter optical fiber and wherein the length of the optical fiber segment is selected to produce a beam at its output end having an energy density that is uniformly distributed in cross-section.

7. The apparatus as recited in claim 6, further comprising:
first focusing means for coupling the beam from the laser to the optical fiber segment, the first focusing means being located between the laser and the input end of the optical fiber segment for reducing the cross-sectional size of the output beam such that the reduced-size beam can be inscribed within the diameter of the small diameter optical fiber; and
second focusing means for coupling the beam from the optical fiber segment to the small diameter optical fiber, the second focusing means being located between the optical fiber segment output end and the small diameter optical fiber.

8. An apparatus for transmitting a high energy laser beam into a small diameter optical fiber, the apparatus comprising:
a laser producing a high energy laser beam having an energy density that varies along its cross-section, with maximum energy density levels that would damage the small diameter optical fiber if focused onto and transmitted directly into the optical fiber;
homogenization means located between the laser and the small diameter optical fiber for operating on the high energy laser beam of varying energy density to produce a homogenized beam of uniform cross-sectional energy density; and
focusing means located between the homogenization means and the small diameter optical fiber for focusing the homogenized beam directly into the small diameter optical fiber.

9. The apparatus as recited in claim 8, wherein the homogenization means comprises a large diameter optical fiber having a diameter greater than that of the small diameter optical fiber.

10. The apparatus as recited in claim 9, wherein the large diameter optical fiber has a length sufficient to cause internal reflections of the high energy laser beam to produce a circular beam of uniform cross-sectional energy density.

11. A method for coupling a non-uniform energy density beam from a high-energy excimer laser to a small diameter output optical fiber for treating atherosclerotic plaque, the method comprising the steps of:
optically reducing the cross-section of the non-uniform laser beam;
providing a large diameter optical fiber coupling segment having a diameter much greater than output fiber, such that the large diameter fiber receives the entire reduced cross-section beam and has sufficient length to produce multiple internal reflections of the beam along its length, thereby producing a homogenized, circular cross-section uniform energy density beam;
optically reducing the produced circular uniform beam and focusing it into the small diameter output optical fiber.

12. A method of coupling a non-uniform energy density beam from a high energy excimer laser to a small diameter output optical fiber for treating atherosclerotic plaque, the method comprising the steps of:
optically reducing the cross-sectional size of the non-uniform laser beam;
converting the reduced cross-section, non-uniform laser beam into a homogenized, substantially uniform energy density beam having a circular cross-section: and
optically reducing the cross-sectional size of the converted substantially uniform energy density circular cross-section beam and directing it into the small diameter output optical fiber, wherein the method couples substantially all of the beam energy from the high energy density excimer laser into the output optical fiber while preventing damage to the output optical fiber from the beam.

13. A method as defined in claim 12, wherein the step of converting includes the step of directing the reduced cross-section non-uniform laser beam into an optical fiber coupling segment having a diameter much greater than the output optical fiber and at least equal to the reduced cross-section laser beam and also having a length sufficient to produce multiple internal reflections of the beam along its length.

* * * * *

UNITED STATES PATENT AND TRADEMARK OFFICE
CERTIFICATE OF CORRECTION

PATENT NO. : 5,044,717

DATED : September 3, 1991

INVENTOR(S) : Jeffrey I. Levatter

It is certified that error appears in the above-identified patent and that said Letters Patent is hereby corrected as shown below:

The attached sheet of drawings should be substituted for the sheet of drawings in the printed patent.

In column 3, line 28, "ne" should be --new--.

In column 7, line 55, "ar" should be --an--.

Signed and Sealed this

Sixteenth Day of February, 1993

*Attest:*

STEPHEN G. KUNIN

*Attesting Officer*   *Acting Commissioner of Patents and Trademarks*

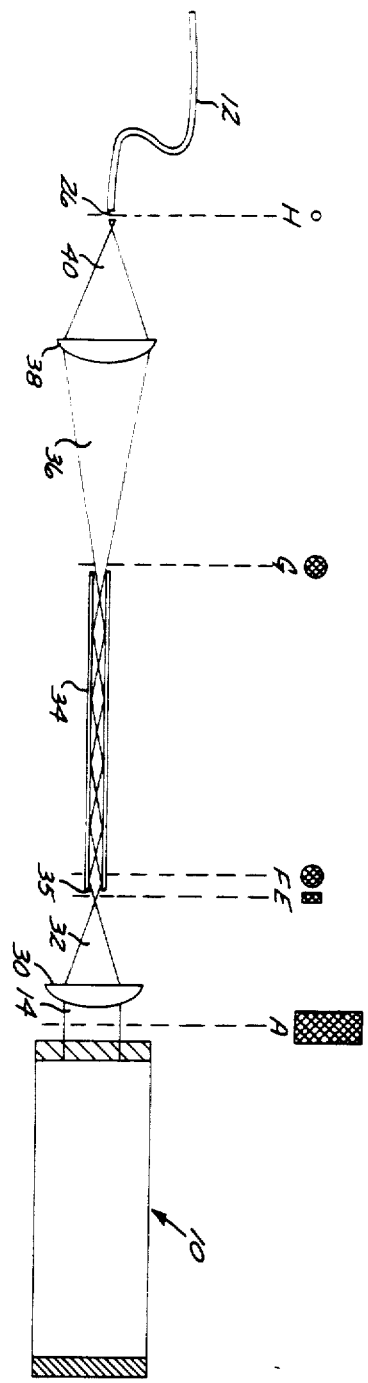
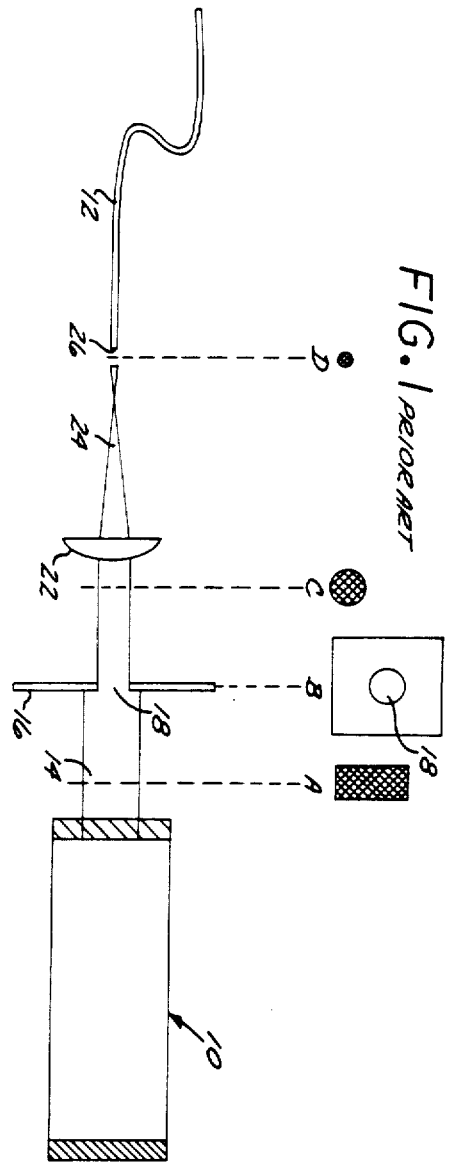
FIG. 1 PRIOR ART
FIG. 2